United States Patent
Martin et al.

[11] Patent Number: 5,853,470
[45] Date of Patent: Dec. 29, 1998

[54] PIGMENTED INK JET INKS CONTAINING ALDEHYDES

[75] Inventors: Thomas W. Martin; Charles E. Romano, Jr.; Joe E. Maskasky, all of Rochester, N.Y.

[73] Assignee: Eastman Kodak Company, Rochester, N.Y.

[21] Appl. No.: 847,858

[22] Filed: Apr. 28, 1997

[51] Int. Cl.$^6$ .................................................. C07D 11/02
[52] U.S. Cl. ......................................... 106/31.86; 106/316
[58] Field of Search ................................ 106/31.86, 31.6

[56] References Cited

U.S. PATENT DOCUMENTS

| | | | |
|---|---|---|---|
| 2,059,817 | 11/1936 | Shappard et al. | 95/7 |
| 3,304,179 | 2/1967 | Field et al. | 96/61 |
| 3,565,632 | 2/1971 | Mills et al. | 96/111 |
| 3,762,926 | 10/1973 | Himmelmann et al. | 96/111 |
| 4,156,616 | 5/1979 | Dietz et al. | 106/308 |
| 4,597,794 | 7/1986 | Ohta et al. | 106/31.89 |
| 4,959,661 | 9/1990 | Buxton et al. | 106/31.86 |
| 5,085,698 | 2/1992 | Ma et al. | 106/31.6 |
| 5,172,133 | 12/1992 | Suga et al. | 346/1.1 |
| 5,223,026 | 6/1993 | Schwartz, Jr. | 106/31.86 |
| 5,279,654 | 1/1994 | Keirs et al. | 106/411 |
| 5,324,349 | 6/1994 | Sano et al. | 106/31.68 |

OTHER PUBLICATIONS

"Introduction to Organic Chemistry", Second Edition, Streitweiser, Jr. et al., pp. 33–37, 1981 (no month available).

*Research Disclosure*, vol.365, Sep. 1994, Item 36544, II, B. Hardeners.

*Primary Examiner*—Helene Klemanski
*Attorney, Agent, or Firm*—Doreen M. Wells

[57] ABSTRACT

Herein is disclosed a liquid ink jet ink comprising a carrier, a pigment and a compound having an aldehyde functional group.

7 Claims, No Drawings

PIGMENTED INK JET INKS CONTAINING ALDEHYDES

FIELD OF THE INVENTION

This invention relates to aqueous inks which utilize pigments as colorants and which are useful for ink jet printing applications. Specifically, this invention relates to additives to pigmented inks which improve the resistance of solid area patches printed on coated papers and films to being removed by water (waterfastness).

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by the carrier medium. The carrier medium can be a liquid or a solid at room temperature. A commonly used carrier medium is water or a mixture of water and organic cosolvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor lightfastness. When water is used as the carrier medium, such inks also generally suffer from poor waterfastness.

Pigment based inks have been gaining in popularity as a means of addressing these limitations. In pigment-based inks, the colorant exists as discrete particles. Pigment-based inks suffer from a different set of deficiencies than dye-based inks. One deficiency is related to the observation that pigment-based inks interact differently with specially coated papers and films, such as the transparent films used for overhead projection and the glossy papers and opaque white films used for high quality graphics and pictorial output. In particular, it has been observed that pigment-based inks produce imaged areas that are entirely on the surface of coated papers and films. Another defect known as "starvation" relates to some inconsistencies of the stream of ink being fired causing changes of image densities and/or loss of information. Starvation is exhibited on plain paper as well as coated papers and films.

U.S. Pat. No. 5,324,349 discloses pigmented inks for ink jet printing comprising monosaccharides, disaccharides, oligosaccharides including trisaccharides and tetrasaccharides, and polysaccharides (e.g., alginic acid, alpha cyclodextrin and cellulose). These additives have a very low molecular weight, below about 1000 and are all water soluble. They are used to prevent plugging of ink jet nozzles. Such additives will not improve image quality or fastness of ink jet printed images.

What is needed, then, is an additive which will improve the resistance of said area patches to being removed by water when printed on resin or plastic coated papers and films, e.g., photographic paper and film supports coated with an ink receptive layer.

SUMMARY OF THE INVENTION

We have unexpectedly found that the addition of certain additives to the pigment-based inks greatly minimizes or eliminates the above mentioned problems.

The present invention relates to pigmented ink jet inks which comprise an aqueous carrier medium, a pigment, and at least one compound containing an aldehyde functional group such as formaldehyde, gluteraldehyde, 2,3-dihydroxy- 1,4-dioxane and the like.

When inks of the present invention are printed onto glossy coated papers and films containing an imaging layer consisting primarily of gelatin, they result in uniform, crack-free text and solid area fills of high optical density and are highly waterfast.

DETAILED DESCRIPTION OF THE INVENTION

Inks useful for ink jet recording processes generally comprise at least a mixture of a solvent and a colorant. The preferred solvent is de-ionized water, and the colorant is either a pigment or a dye. Pigments are often preferred over dyes because they generally offer improved waterfastness and lightfastness on plain paper.

The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a preferred embodiment, the grinding media can comprise particles, preferably substantially spherical in shape, e.g., beads, consisting essentially of a polymeric resin.

In general, polymeric resins suitable for use as milling media are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin™, vinyl chloride polymers and copolymers, polyurethanes, polyamides, poly (tetrafluoroethylenes), e.g., Teflon™, and other fluoropolymers, high density polyethylenes, polypropylenes, cellulose ethers and esters such as cellulose acetate, poly(hydroxyethylmethacrylate), poly (hydroxyethyl acrylate), silicone containing polymers such as polysiloxanes and the like. The polymer can be biodegradable. Exemplary biodegradable polymers include poly (lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm$^3$. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an airjet mill, a roller mill, a ball mill, an attritor mill and a bead mill. A high speed mill is preferred. The high speed mill is a high agitation device, such as those manufactured by Morehouse-Cowles, Hockmeyer et al.

By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, $\pi$, and the impeller diameter. Sufficient milling media velocity is achieved, for example, in Cowles-type saw tooth impeller having a diameter of 40 mm when operated at 7,000 rpm. The preferred proportions of the milling media, the pigment, the liquid dispersion medium and dispersant can vary within wide limits and depends, for example, upon the particular material selected and the size and density of the milling media etc. The process can be carried out in a continuous or batch mode.

Batch Milling

A slurry of <100 $\mu$m milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

Continuous Media Recirculation Milling

A slurry of <100 $\mu$m milling media, liquid, pigment and dispersant may be continuously recirculated from a holding vessel through a conventional media mill which has a media separator screen adjusted to >100 $\mu$m to allow free passage of the media throughout the circuit. After milling is complete, the dispersion of active material is separated from the grinding media by simple sieving or filtration.

With either of the above modes the preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water.

For aqueous ink jet inks, the pigment is usually present in the mill grind at 1 to 50 weight %, excluding the milling media. The weight ratio of pigment to dispersant is 20:1 to 1:2.

The liquid carrier medium can also vary widely and, again, will depend on the nature of the ink jet printer for which the inks are intended. For printers which use aqueous inks, water, or a mixture of water with miscible organic co-solvents, is the preferred carrier medium.

Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

The dispersant is another important ingredient in the mill grind. Although there are many dispersants known in the art, the best dispersant will be a function of the carrier medium and will also often vary from pigment to pigment. Preferred dispersants for aqueous ink jet inks include sodium dodecyl sulfate, acrylic and styrene-acrylic copolymers, such as those disclosed in U.S. Pat. Nos. 5,085,698 and 5,172,133, and styrenics, such as those disclosed in U.S. Pat. No. 4,597,794. For the present invention, the most preferred dispersant is oleoyl methyl taurine, sodium salt (OMT), obtained from Synthetic Chemical Div. of Eastman Kodak Co.

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

In the present invention, any of the known pigments can be used. Pigments can be selected from those disclosed, for example, in U.S. Pat. No. 5,085,698, Cols. 7 and 8. The exact choice of pigment will depend upon the specific color reproduction and image stability requirements of the printer and application. For four-color printers, combinations of cyan, magenta, yellow, and black (CMYK) pigments should be used. An exemplary four color set may be a bridged aluminum phthalacyanine pigment, copper phthalocyanine (pigment blue 15), quinacridone magenta (pigment red 122), pigment yellow 138 and carbon black (pigment black 7).

Ink Preparation

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.5 to 10%, preferably approximately 0.1 to 5%, by weight of the total ink composition for most thermal ink jet printing applications. If an inorganic pigment is selected, the ink will tend to contain higher weight percentages of pigment than with comparable inks employing organic pigments, and may be as high as approximately 75% in come cases, since inorganic pigments generally have higher specific gravities than organic pigments.

The amount of aqueous carrier medium is in the range of approximately 70 to 98 weight %, preferably approximately 90 to 98 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

In the dilution step, other ingredients are also commonly added to pigmented ink jet inks. Cosolvents (0–20 wt %) are added to help prevent the ink from drying out or crusting in the orifices of the printhead or to help the ink penetrate the receiving substrate, especially when the substrate is a highly sized paper. Preferred cosolvents for the inks of the present invention are glycerol, ethylene glycol, and diethylene glycol, and mixtures thereof, at overall concentrations ranging from 5 to 25 wt %.

In the context of the present invention, an especially important additive is a compound containing an aldehyde functionality such as formaldehyde, glutaraldehyde, 2,3-dihydroxy-1,4-dioxane (DHD) and the like.

It is contemplated that aldehyde containing compounds, or precursors to aldehyde containing compounds, that are effective hardening agents for gelatin coatings are also useful in the practice of this invention. Some compounds known to be effective hardening agents are 3-hydroxybutyraldehyde (U.S. Pat. No. 2,059,817), crotonaldehyde, the homologous series of dialdehydes ranging from glyoxal to adipaldehyde, diglycolaldehyde (U.S. Pat. No. 3,304,179) and various aromatic dialdehydes (U.S. Pat. No. 3,565,632 and U.S. Pat. No. 3,762,926). Additional related hardening agents can be found in Research Disclosure, Vol. 365, September 1994, Item 36544, II, B. Hardeners.

It has been unexpectedly found that improved image quality, excellent optical density, and improved waterfastness on gelatin coated papers and films can be achieved when specific compounds containing aldehyde functionality are added to the ink compositions. Most preferred is DHD at concentrations ranging from about 0.20 to 3.0 wt % based on the total weight of the ink.

A biocide (0.01–1.0 wt %) may be added to prevent unwanted microbial growth which may occur in the ink over time. A preferred biocide for the inks of the present invention is Proxel GXL (obtained from Zeneca Colours) at a final concentration of 0.05–0.5 wt %.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279, 654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 10.0, more preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or co-solvent, is commonly added to help prevent the ink from drying out or crusting in the orifices of he printhead. A penetrant may also be optionally added to help the ink penetrate the receiving substrate, especially when the substrate is a highly sized paper. A biocide, such as Proxel® GXL from Zeneca Colours may be added at a concentration of 0.05–0.5 weight percent to prevent unwanted microbial growth which may occur in the ink over time. Additional additives which may optionally be present in ink jet inks include thickeners, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers.

Commercially available ink jet printers use several different schemes to control the deposition of the ink droplets. Such schemes are generally of two types: continuos stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance with digital data signals. An ink droplet is not generated and ejected through the orifices of the print head unless it is needed. Ink jet printing methods, and related printers, are commercially available and need not be described in detail.

The following examples further clarify the invention.

COMPARATIVE EXAMPLE A

Mill Grind

| Mill Grind | |
|---|---|
| Polymeric beads, mean diameter of 50 $\mu$m (milling media) | 325.0 g |
| Black Pearls 880 (Cabot Chemical Company) (pigment black 7) | 30.0 g |
| Oleoyl methyl taurine, (OMT) sodium salt | 10.5 g |
| Deionized water | 209.5 g |
| Proxel GLX (biocide from Zeneca) | 0.2 g |

The above components were milled using a high energy media mill manufactured by Morehouse-Cowles Hochmeyer. The mill was run for 8 hours at room temperature. An aliquot of the above dispersion to yield 2.0 g pigment was mixed with 5.0 g diethylene glycol, 5.0 g glycerol, and additional deionized water for a total of 100.0 g. This ink was filtered through 3-$\mu$m filter and introduced into an empty Hewlett-Packard 51626A print cartridge. Images were made with a Hewlett-Packard DeskJet™540 printer on medium weight resin coated paper containing a gelatin imaging layer.

The resin coated paper stock was coated with an imaging layer consisting of about 785 mg/ft$^2$ of lime processed bone gelatin, about 8 mg/ft$^2$ polystyrene beads (10–14 micron average particle size) and about 4 mg/ft$^2$ Olin 10 G surfactant.

COMPARATIVE EXAMPLES B–D.

Inks were prepared in a similar manner as described in Comparative Example A. except, the black pigment was replaced by a quinacridone magenta (pigment red 122) from Sun Chemical Co., Hansa Brilliant Yellow (pigment yellow 74) from Hoechst Chemical Co. or Bis (phthalocyanylalumino)tetra-phenyldisiloxane (cyan pigment) manufactured by Eastman Kodak. The inks were printed as in Comparative Example A. and image cracking was noticeable in each sample.

EXAMPLE 1

An ink was prepared in the same manner as that described in Example A, except 10.0 g of 10 wt % solution of 2,3-dihydroxy-1,4-dioxane (DHD) obtained from Kodak Photochemicals was added to the mixture to obtain a final DHD concentration of 1.0 wt %. Images from this ink were very smooth without any signs of image cracking.

EXAMPLES 2 AND 3

Inks were prepared in the same manner as that described in Example 1, except that DHD was replaced with formaldehyde and gluteraldehyde, respectively. Images from these inks were very smooth without any signs of image cracking or starvation lines.

EXAMPLES 4–7

Inks were prepared in the same manner as that described in Example B (pigment red 122 millgrind), except that DHD was added at 0.30 (Example 4), 0.50 (Example 5), 1.0 (Example 6), and 2.0 wt % (Example 7). Images from these inks exhibit no cracking at all concentrations of DHD.

EXAMPLES 8–9

Inks were prepared in the same manner as that described in Example 1, except that the pigment black 7 was replaced with the pigment yellow 74 or the cyan pigment. Images made with these inks exhibited excellent quality without and signs of cracking.

Ink Characterization

The images printed from the examples were evaluated by measuring the optical densities in three area patches with maximum ink coverage, and averaging, using a X-Rite™ Photographic Densitometer.

Waterfastness was determined by immersing samples of printed images in water for 5 minutes and the allowing to dry for at least 12 hours. The optical density was measured before immersion in water and after immersion in water and drying. Waterfastness is determined as the percent of retained optical density after immersion in water and drying.

Table 1. All examples are summarized in the following table.

TABLE 1

| Example | Pigment | % Pigment | Additive | Density Before | Density After | % Retained Density |
|---|---|---|---|---|---|---|
| Comp. A | p.b. 7 | 2.0 | none | 2.19 | 1.85 | 84.47 |
| Comp. B | p.r. 122 | 3.0 | none | 2.02 | 0.45 | 22.28 |
| Comp. C | p.y. 74 | 2.5 | none | 1.79 | 0.76 | 42.46 |
| Comp. D | cyan | 2.5 | none | 2.27 | 1.06 | 46.70 |
| 1 | p.b. 7 | 2.0 | DHD | 2.15 | 2.14 | 99.53 |
| 2 | p.b. 7 | 2.0 | Formaldehyde | 2.32 | 2.32 | 100.0 |
| 3 | p.b. 7 | 2.0 | Gluteraldehyde | 2.60 | 2.36 | 90.77 |
| 4 | p.r. 122 | 3.25 | DHD | 2.15 | 2.03 | 94.42 |
| 5 | p.r. 122 | 3.25 | DHD | 2.16 | 2.05 | 94.91 |
| 6 | p.r. 122 | 3.25 | DHD | 2.22 | 2.17 | 97.75 |
| 7 | p.r. 122 | 3.25 | DHD | 2.15 | 2.05 | 95.35 |
| 8 | p.y. 74 | 2.5 | DHD | 1.82 | 1.81 | 99.45 |
| 9 | cyan | 2.5 | DHD | 2.27 | 2.06 | 90.75 | p.b. 7 = pigment black No. 7 (Black Pearls 880, Cabot Chemical Co.)
p.r. 122 = pigment red No. 122 (Quinacridone Magenta, Sun Chemical Co.)
p.y. 74 = pigment yellow No. 74 (Hansa Brilliant Yellow, Oechst Chemical Co.)
cyan = Bis(phthalocyanylalumino)tetra phenyldisiloxane
DHD = 2,3-dihydroxy-1,4-dioxane The results indicate that significant enhancement of the waterfastness of printed images, printed on glossy papers and films, can be achieved with the addition of a compound containing aldehyde functionality such as 2,3-dihydroxy-1,4-dioxane(DHD), formaldehyde, gluteraldehyde and the like to the ink jet ink.

The invention has been described in detail with particular reference to certain preferred embodiments thereof, but it will be understood that variations and modifications can be effected within the spirit and scope of the invention.

We claim:

1. A liquid ink jet ink comprising a carrier, a pigment and at least one compound selected from an aldehyde compound and a precursor to an aldehyde compound.

2. The liquid ink jet ink of claim 1 wherein the concentration of the aldehyde compound is about 0.2 to 3.0 weight percent based on the total weight of the ink composition.

3. The liquid ink jet ink of claim 2 wherein the concentration of the aldehyde compound is about 1.0 to about 2.0 weight percent based on the total weight of the ink composition.

4. The liquid ink jet ink of claim 1 wherein the aldehyde compound is selected from the group consisting of formaldehyde and glutaraldehyde.

5. The liquid ink jet ink of claim 1 wherein the pigment is selected from pigment black No. 7, pigment red No. 122, pigment yellow No. 74 and a bridged aluminum phthalocyanine pigment.

6. The liquid ink jet ink of claim 1 wherein the precursor to an aldehyde compound is 2,3-dihydroxy-1,4-dioxane.

7. An ink jet printing method, comprising the steps of:

providing an ink jet printer that is responsive to digital data signals;

loading the printer with ink receptive substrates;

loading the printer with an ink jet ink according to claim 1; and printing on the ink receptive substrates in response to the digital data signals.

* * * * *